US012273542B1

(12) United States Patent
King et al.

(10) Patent No.: US 12,273,542 B1
(45) Date of Patent: Apr. 8, 2025

(54) HIGH FIDELITY COLOR IN THE CLOUD

(71) Applicant: Amazon Technologies, Inc., Reno, NV (US)

(72) Inventors: Katrina Renee King, Long Beach, CA (US); Matthew Ross Herson, Moorpark, CA (US); Mike Owen, Greater London (GB); Evan Statton, Denver, CO (US)

(73) Assignee: Amazon Technologies, Inc., Reno, NV (US)

( * ) Notice: Subject to any disclaimer, the term of this patent is extended or adjusted under 35 U.S.C. 154(b) by 227 days.

(21) Appl. No.: 17/676,592

(22) Filed: Feb. 21, 2022

(51) Int. Cl.
*H04N 19/186* (2014.01)
*H04N 19/184* (2014.01)

(52) U.S. Cl.
CPC ......... *H04N 19/186* (2014.11); *H04N 19/184* (2014.11)

(58) Field of Classification Search
CPC .................... H04N 19/186; H04N 19/184
See application file for complete search history.

(56) References Cited

U.S. PATENT DOCUMENTS

| | | | |
|---|---|---|---|
| 2006/0050787 A1* | 3/2006 | Winger | H04N 19/30 375/E7.088 |
| 2008/0137751 A1* | 6/2008 | Roman | H04N 19/70 375/E7.199 |
| 2010/0011012 A1* | 1/2010 | Rawson | H04L 67/30 707/E17.009 |
| 2013/0050254 A1* | 2/2013 | Tran | H04N 19/103 345/629 |

\* cited by examiner

*Primary Examiner* — Richard T Torrente
(74) *Attorney, Agent, or Firm* — Hogan Lovells US LLP

(57) ABSTRACT

Media content may be mastered at a higher quality than is supported on various remote workstations to perform tasks with respect to that content, using transmission channels that do not support data transfer rates for large, high quality media content. A compressed version of this content may be transmitted over a first channel for use with various tasks on a remote workstation. For tasks such as color grading that benefit from this higher quality content, a separate but parallel communication channel is used to transmit a higher-quality version of this content. An uncompressed video stream can be encoded using a lossless codec to retain higher quality data. A high quality video stream can be transmitted over a separate transmission channel, and received to a decoder that can decode this stream to provide a high quality video signal for presentation via a grading monitor or other such high quality presentation device.

20 Claims, 8 Drawing Sheets

HIGH FIDELITY COLOR IN THE CLOUD

BACKGROUND

For applications such as motion picture and television content generation, there are various tasks that benefit from access to high quality versions of this content. These can include, for example, tasks such as color grading, visual effects (VFX) compositing, digital intermediate finishing, and master quality control, which can benefit from, or in some cases require, access to high fidelity color data. In order to be able to obtain low bitrate data streams useful for various tasks, streaming clients typically provide limitations on color depth and other such aspects in order to reduce an amount of data to be transmitted, such as by using or supporting a lossy codec such as High Efficiency Video Coding (HEVC), which can be unreliable and, in at least some examples, inappropriate for these tasks. If unable to receive high fidelity color data, tasks such as color grading can be inaccurate at best, because color data from only a subset of the overall color space will be available on a device receiving this limited data stream.

BRIEF DESCRIPTION OF THE DRAWINGS

Various embodiments in accordance with the present disclosure will be described with reference to the drawings, in which.

DETAILED DESCRIPTION

Approaches described and suggested herein relate to the providing of media content in a network- or cloud-based environment. Media content may be mastered at a higher quality than is supported, or capable of being displayed, on various remote workstations that may be used to perform tasks with respect to that content, using transmission channels that do not readily support the amount of data transmission needed to transmit this media content at that higher quality. Accordingly, a compressed version of this content may be transmitted for use with various tasks on a remote workstation or other such device. For tasks such as color grading that require, or at least benefit from, this higher quality content, a separate but parallel communication channel can be used to transmit this higher quality content. In at least one embodiment, an uncompressed video stream can be provided for this content, which can be encoded using a lossless codec to retain most, if not all, of this additional quality data. This high quality video stream can be transmitted over a separate transmission channel, and received to a decoder or other such component. This decoder can decode this digital video stream, and can provide this high quality video signal for presentation via a grading or reference monitor, or other such high quality presentation device.

Various other such functions can be used as well within the scope of the various embodiments as would be apparent to one of ordinary skill in the art in light of the teachings and suggestions contained herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
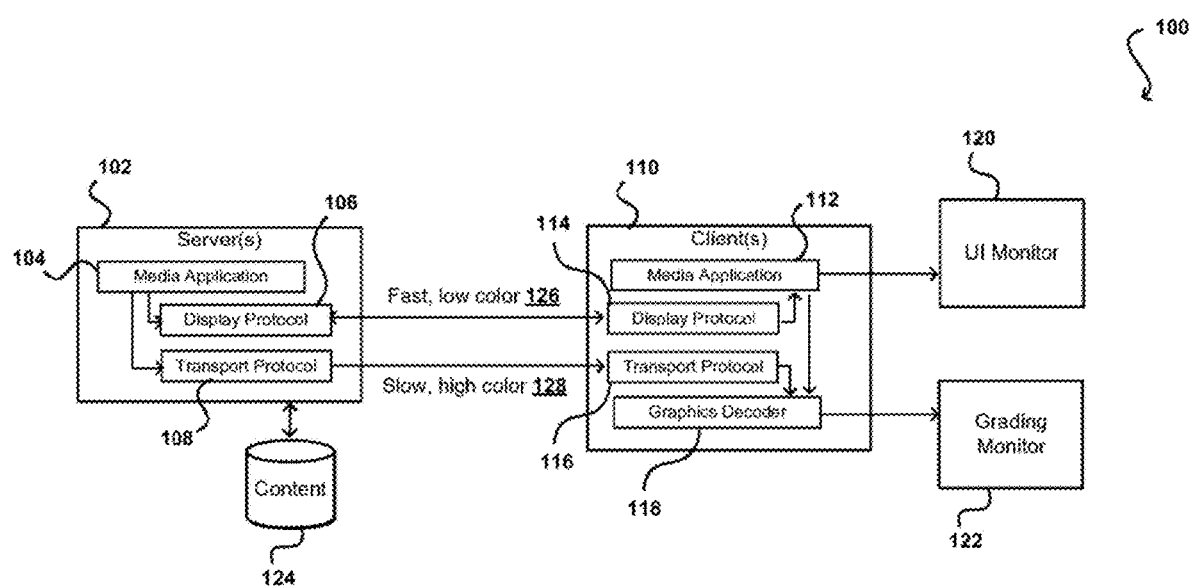
FIG. 1 illustrates an example system for providing media content that can be utilized in accordance with various embodiments.

FIG. 1 illustrates an example system 100 that can be used to create or modify content, such as audio, video, or other media content, in accordance with various embodiments. In this example, this system includes both a server-side component and a client-side component, although a system or service could include only one of these components, or could include additional components, in various embodiments. In this example, at least one server 102 (or other host device, such as a virtual machine or machine instance) is used to host a media application 104, such as a content generation, editing, or color grading application, that can generate, synthesize, edit, or modify content such as high resolution, high color video content. In at least one embodiment, this may include one of a number of physical or virtual servers, or server instances, that may execute this application, portions of this application, or a variety of applications to create or modify content, as may be stored in at least one content repository 124 accessible to this server 102. This server may be part of a cloud offering, or hosted in a shared resource or multi-tenant network environment, as discussed in more detail elsewhere herein. In this example system, at least one client device 110 may access at least a portion of this content over at least one wired or wireless network connection, direct connection, or peer connection, among other such options. In many instances, this connection may be an Internet or cellular network connection. In this example, one or more client devices 110, as may be part of a network of devices, will also execute at least one media application 112, which can be the same as a media application 104 on the server 102, may be a companion application to the media application 104 running on the server, or may be a different application for performing one or more tasks with respect to media content received from the server 102, or generated on the client device 110 to be transmitted to the server 102, among other such options. In at least some instances, a client device 110 will run a lightweight application to perform one or more editing tasks, while a server 102 will run a full-featured application that can perform a wide variety of tasks on uncompressed, high quality media content. In at least one embodiment, a client device may utilize a remote access application (e.g., a remote desktop application) corresponding to a media application hosted on a server device.

In this example, the media application 112 on the client device may need to receive media content at an appropriate bitrate or transfer rate, such as may correspond to a live broadcast. At least a portion of this content can be displayed on a UI monitor 120 to enable a user to view this content as it is created, modified, or presented. In various systems, this UI monitor will have a limited color depth, or color space, that will represent fewer colors than a "full" color space that may be used to generate or master a high-quality version of the content on the server 102. For at least this reason, it may be acceptable to transmit media content to this client device 110 that has a reduced color depth with respect to a full color depth for this content. Further, as mentioned, the server 102 and client device 110 may communicate this content according to a specific protocol, referred to herein as a display protocol, which may provide for transmission of this content at a reduced color depth, as well as potentially other reductions in quality as may correspond to a codec or parameter setting for this display protocol, or transmission components 106, 114 implementing this display protocol. This reduction in quality may be due not only to limitations of the client device 110, but also limitations on the transmission or network connection itself, such as to allow for sufficient bitrates of transmission over limited bandwidth connections. Such a connection thus can provide sufficiently high bitrates for various applications, but sacrifice at least some video quality, such as by transmitting with a reduced color depth.

For various applications, working with a reduced color depth may not be problematic, as a UI monitor may not be able to display an entire color space, and an average user may not be able to tell there was a reduction in color space or bit depth, or at least such reduction may not prevent a user from successfully performing specific tasks. There are other tasks, however, where this reduction in color depth, or other such reduction in media quality, may prevent a user from accurately or successfully performing one or more tasks. This can include, for example, performing one or more grading tasks using a grading monitor 122. Color grading in general refers to the enhancement or altering of color for media content, such as movie, film, program, or image content. Grading can be performed to obtain a specific look, feel, or mood for a scene, as well as to ensure smooth and accurate color that is free from color-related artifacts. In some embodiments, color correction will be performed before color grading, in order to ensure that colors are consistent between shots or scenes, and then color grading can be performed to fine tune the colors selected for these consistent shots. In order to provide for accurate grading and other such tasks, high color depth content is to be displayed on a grading monitor so that a user performing this task can view the actual results without hidden values or degradation. As mentioned, however, such quality may not be provided over a fast, but lower color or quality transmission channel.

In this example, system, a second transmission channel 128 can be utilized that is able to provide higher quality content, such as media content with a higher bit depth. While bandwidth or other limitations may limit a speed with which this content may be transmitted in at least some systems, or for some network connections, tasks such as color grading may not require such transmission speeds. In this example, a media application 104 executing on a server 104 can cause a high quality version of content to be transmitted using a separate transport protocol-based component 108, such as may provide a channel implemented using an Internet Protocol (IP)-based approach. This content can be received to the client device 110 using a similar transport protocol-based component 116. This high-quality media content can then be provided, along with data such as automation data from the media application 112, to a graphics decoder that is able to provide an appropriate media output for presentation via a high quality grading monitor, or other such grading-appropriate display. In this way, a media application 112 is able to receive a lower quality version of the content at a sufficient bitrate for various tasks using a fast but low color transmission 126, and a graphics decoder 118 of a client device, which may be a different device than the client device that runs the local media application 112, can receive a higher quality version of the content, albeit at a potentially higher bitrate, over a slow but high quality transmission channel. Such an approach enables an existing media application to continue to work without modification, but can allow a client device to provide a high quality presentation of content for purposes such as grading.

In one example, a workload for motion picture or television content may require high fidelity color monitoring and task performance as discussed above. Such applications have previously been precluded from running across a network, or "in the cloud," due at least in part to the 8-bit 4:2:0 sRGB or similar limitations of modern pixel streaming clients, such as Teradici or Nice DCV from Amazon.com, Inc. Nice DCV, for example, can capture or generate a screen shot for individual frames, and then use a component such as a graphics processing unit (GPU) to encode the picture, which effectively downgrades or compresses the image, reducing image quality. Various post-production activities currently require, or are desired to utilize, content with high color fidelity. Color fidelity in general is a measure of color quality, representing an accuracy with which a digital camera reproduces color in an image. Higher color fidelity will have more color options and can therefore more accurately represent nuanced differences in color. In some embodiments, high color fidelity content would have at least 10-bit or 12-bit color depth, 4:4:4 or 4:2:2 chroma subsampling, and the correct color space for the deliverable being worked upon, such as may correspond to Rec. 709, Rec. 2020 or DCI-P3. As mentioned, due to the high bitrates associated with such video signals, it has to date been at least impractical, if not impossible in at least certain settings, to efficiently egress these video signals from the cloud without employing lossy codecs such as High Efficiency Video Coding (HEVC), which are unreliable and inappropriate for these use cases.

Approaches in accordance with various embodiments can provide for efficient streaming or transmission of visually lossless content, such as 10-bit and 12-bit video with 4:2:2 or 4:4:4 chroma subsampling in a variety of color spaces. In at least one embodiment, this can be accomplished by utilizing one or more additional digital interfaces that are able to integrate with applications, such as those used for color grading, finishing, VFX and quality control. One such interface is the AWS Cloud Digital Interface (CDI) from Amazon.com, Inc. Using such an interface, as illustrated to be implemented by transport protocol components 108 and 116 in FIG. 1, an uncompressed video signal can be transcoded in real time to a signal that can be transmitted, also in real time, over a separate channel to be directed to a graphics decoder 118. Once decoded, using automation information obtained from the media application 112 processing data from the fast, low color channel 126, this decoded information can be provided to a grading monitor 122, broadcast monitor, or other such component or device for presentation and review. Such an approach enables such a system 100 to deliver high-fidelity color video from a cloud provider to a remote or on-premises environment, which can significantly expand the number of film, television, and other such workloads that can be run, or processed at least partially, in the cloud.

Figure 2:
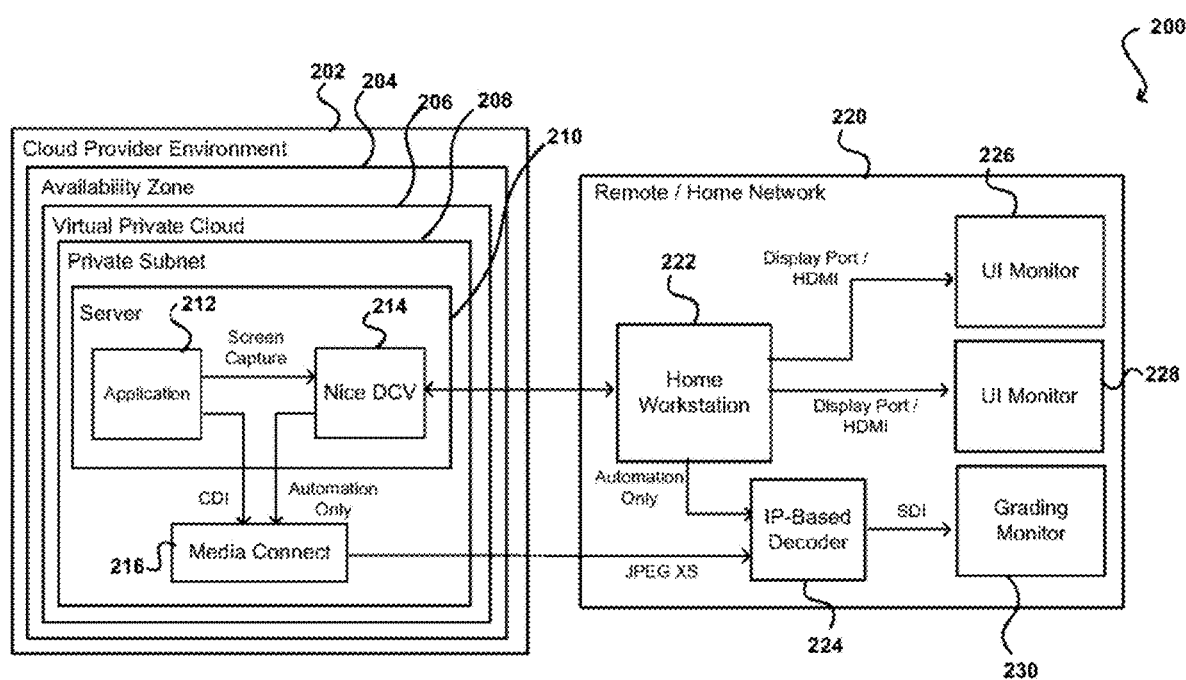
FIG. 2 illustrated an example system for providing media content streams of different fidelity, in accordance with various embodiments.

FIG. 2 illustrates another such system 200 that can be used to host or process such high quality media in the cloud, and provide that high quality video to a workstation in a remote environment. In this example, there is at least one server 210, or server instance, that can be provided using physical and/or virtual resources in a cloud provider environment 202. In this example, the server 210 (such as may include one or more Amazon EC2 instances) can be allocated in a private subnet 208 of a virtual private cloud 206 allocated to that customer. In this example the resources are all provided from the same availability zone 204 or geographical region, although resources can be split across such zones or regions in other embodiments. Such allocation of resources enables the user to operate these resources as if there were owned by the user and under full control of the user, as well as providing for high security to prevent unauthorized access to any of the content generated in such an environment.

In this example, the server 210 executes at least one application 212 for generating or modifying media content, as may include a video editor for finishing a movie. In this example, content generated or modified by this application can be transmitted to a home workstation 222 in a remote or home network environment 220 for further processing, such as may be performed by a color artist working from home. In this example, the content may be transmitted over a network connection, such as the Internet or a cellular network. As mentioned, for various tasks it can be desirable to transmit content at a high bitrate and enable content to be received in near real time, such as at around 24 or 240 frames per second, such that it may not be possible to transmit a full, high quality version of this content over that network connection due to the amount of data that could entail. As such, that content can be reduced in quality, compressed, or otherwise modified to reduce an amount of data to be transferred. In this example, the compression is performed using a Nice DCV virtual display driver from Amazon.com, Inc., such as one compatible with an EC2 instance. Nice DCV is a high-performance remote display protocol that can provide a secure way to deliver or stream content from a cloud or data center to a device, over potentially varying network conditions. In at least one embodiment, the Nice DCV component 214 receives a screen capture of each video frame from an application 212, and compresses or encodes this frame data to be transmitted to a compatible interface of a remote device, in this example a home workstation 222 of a remote or home network 220. This home workstation 222 may include various applications that can be used to perform editing or other work on this media content, such as may involve display of at least some of this media content on one or more user interface monitors 226, 228, such as may be connected to this workstation 222 using a display port or high-definition multimedia interface (HDMI) connection, among other such options. As mentioned, this media content received from the Nice DCV will be at least somewhat compressed or reduced in quality to accommodate the need for fast frame transfer, which may be sufficient for various editing tasks to be performed on a home workstation 222 and displayed by a UI monitor 226, 228, but this reduction in quality, particularly for aspects such as color depth, can prevent this content from being sufficient for use in grading or similar tasks. A current setup may utilize two UI monitors that would typically run in 8-bit or 10-bit color, as conventional operating systems only support up to 10 bit color and often run in 8-bit by default. The workstation 222 may include a card or component, such as an SDI card, that can provide the higher quality video content for display on a grading monitor 30. Such an SDI card can take the uncompressed video from the application and feed it out over a comparable wire, such as an SDI cable, to the grading monitor 230. A grading monitor is, in general, not a computer monitor, but a broadcast monitor or a reference monitor that can present master-quality video, including a reproduction in the correct color space and in the correct bit depth. A grading monitor can also provide for functions such as calibration.

In this example, an application 212 executing on the server 210 can utilize a separate channel to transmit a full, high quality version of this media content across one or more network connections, which can be received by this remote or home network 220, although at a potentially higher rate in terms of frame transmission due to the significantly larger amount of data used to represent each high-quality frame. In this example, the uncompressed video signal is transcoded in real-time using a media connect component, such as AWS Elemental MediaConnect. The video signal can be transcoded to an appropriate format, such as to a JPEG-XS signal, which can be transmitted according to a digital transmission standard such as SMPTE 2110-22, or any of another suite of standards from the Society of Motion Picture and Television Engineers (SMPTE) to indicate how to send digital media over an Internet Protocol (IP) connection, although other transmission protocols or standards can be utilized in other embodiments. In this example, the digital signal is received to an IP-based decoder box 224 in the remote or home network 220. In this example, the high quality video, as may be decoded using automation data from the home workstation 222, can be transmitted for display using a professional quality video signal or channel, such as a serial digital interface (SDI) connection. In at least one embodiment, the automation data may be provided by an automation layer that can take various forms, as may include an extension or continuation of a Nice DCV or similar component. This video can then be displayed using a high quality monitor or display, such as a grading monitor 230. Such an approach can provide for delivery of high-fidelity color video from a cloud provider to an on-premises environment as discussed above. In some embodiments, one or more automation layers can be utilized that allow a broadcast quality grading monitor 230 to behave as a plug-and-play device on, for example, an EC2 instance. Such an approach can provide high quality content using an IP-based signal that can be decoded by a small box that sits on the desk of a user. A decoder, such as a JPEG XS decoder, can decode that IP-based digital signal and convert that signal back to a signal that can be provided to the grading monitor over an SDI (or similar) connection, so that the grading monitor can display a high fidelity image.

Such a system can overcome various limitations currently in place, as use of post-production applications in the cloud has been limited due, at least in part, to the way in which a film or television show is mastered, which is significantly different than the way that content would be viewed on a home television set or tablet computer, for example. There are various factors that determine video quality, as may include chroma subsampling and bit depth. Chroma subsampling is a compression algorithm that allows video to be compressed in such a manner that not every pixel is necessarily read or encoded, but rather there are predictive calculations that surround a given pixel. A common type of chroma subsampling is 4:2:2, which basically skips every other pixel and every other line. While such a compression algorithm may be appropriate for a use case such as television broadcast, the original film or media content is mastered in higher quality, which can help to "futureproof" that content for different types of exploitation opportunities that may, or may not, exist at a time at which that content is mastered. Bit depth relates to a number of bits allocated per pixels or per channel (e.g., an encoding block per channel, per pixel), which are often set to 8, 10, 12, or 16 bits. Television broadcasts are often mastered at 4:2:2 chroma subsampling with a bit depth of 10. Each pixel will have a red channel, a green channel, and a blue channel, and then each of those channels would be allocated 10 bits in a broadcast example. Motion pictures, on the other hand, are often mastered at 12 or 16 bit, 4:4:4 subsampling, with no compression as far as how pixels are read or encoded. A challenge with existing systems to support such content is that there are only a few primary options for connecting a workstation, such as a remote desktop protocol from Microsoft, Teradici, or Nice DCV from Amazon.com, Inc. As mentioned, however, these options are generally designed to be light weight, supporting protocols that allow for easy access with low bandwidth requirements, such as may be limited in support to 8 bit, 4:2:2 encoding. This is generally not sufficient for tasks such as motion picture content grading, as content mastered with 12- or 16-bit sampling would essentially have around 95% of the color information and nuance lost through this lower quality encoding. The lower resolution version can be used for offline processing, such as for rough video effects compositing, but this lower quality version would prevent a user from detecting possible problems or artifacts that might be present in higher quality versions with a true digital signal that are to be provided as a final deliverable. In various cases, these "hidden" problems could prevent this final version from passing quality control.

A system such as that illustrated in FIG. 1 or FIG. 2 can overcome these and other deficiencies in existing systems and approaches by providing a mechanism by which a user or entity can complete their entire post-production lifecycle in the cloud. For various reasons, it may not make economic or practical sense to be switching between doing certain processes in the cloud and others remotely or on-premises using one or more home workstations. Such an approach can also be expensive in terms of resources, as it can involve hosting extremely large assets in multiple places, as well as data egress costs for transferring multiple versions or portions of these large assets. These limitations often result in a majority of workflows being performed using offline activities, such as offline editing, and certain online processes that use the original camera negatives being performed in an on-prem environment, simply because it is not practical to transfer the full, high quality, high fidelity color signal out of the cloud.

An interface such as Cloud Digital Interface (CDI) can be used, which is an open source SDK that can integrate into applications for tasks such as color grading, digital intermediate VFX compositing, and master quality control, which require high fidelity color. In some embodiments, the CDI SDK can be integrated into these applications, so that these applications can treat this output as if it were being transmitted using a more typical video transport mechanism, such as for serial digital interface (SDI) output. The application can then feed the uncompressed video to the CDI SDK, which can carry that that video to a media connect component 216, such as Elemental MediaConnect. As mentioned, MediaConnect can utilize a codec such as JPEG XS codec, which can be beneficial for various cloud-based workflows. Such a codec can perform better for such tasks than other, more commonly used codes that may be lossy, as may include H264, H265, or VP9. While these codecs may be lossy, they are also highly compressible, and can serve a valuable purpose of making streaming to mobile devices, or to low bandwidth connections, easy and practical. When it comes to high fidelity color and high fidelity video signals, however, such codecs take to many liberties with the pixels. They often utilize predictive algorithms, such that one full frame will be encoded and then there may be three frames that are predicted, followed by a fourth frame that is a full frame, and so on. Such compression approaches can make these codecs lossy by definition. In order to avoid these and other such problems, a lossless codec can be used to ensure that the true picture is being transported. Using a lossless codec such as JPEG XS with MediaConnect can then provide access to a highly compressible lossless codec that, depending on the application, is lossless between compression ratios of, for example, 6:1 and 10:1. In this way, a 6 Gbps digital picture, representative of a high end workflow, can be processed using such a system, where traditional systems would have difficulty attempting to stream and utilize a 6 Gbps signal. Lossless compression using a 6:1 JPEG XS codec, however, can reduce this to around 0.5 Gbps, which can be streamed over many common network connections. Such a system can enable a user to effectively extend a video network from the on-prem environment into a cloud environment in a seamless way, with low latency. Such transmission enables a grading monitor to essentially present content, or enables content to be viewed remotely, as it is being created or modified in the cloud with full quality.

Figure 3A:
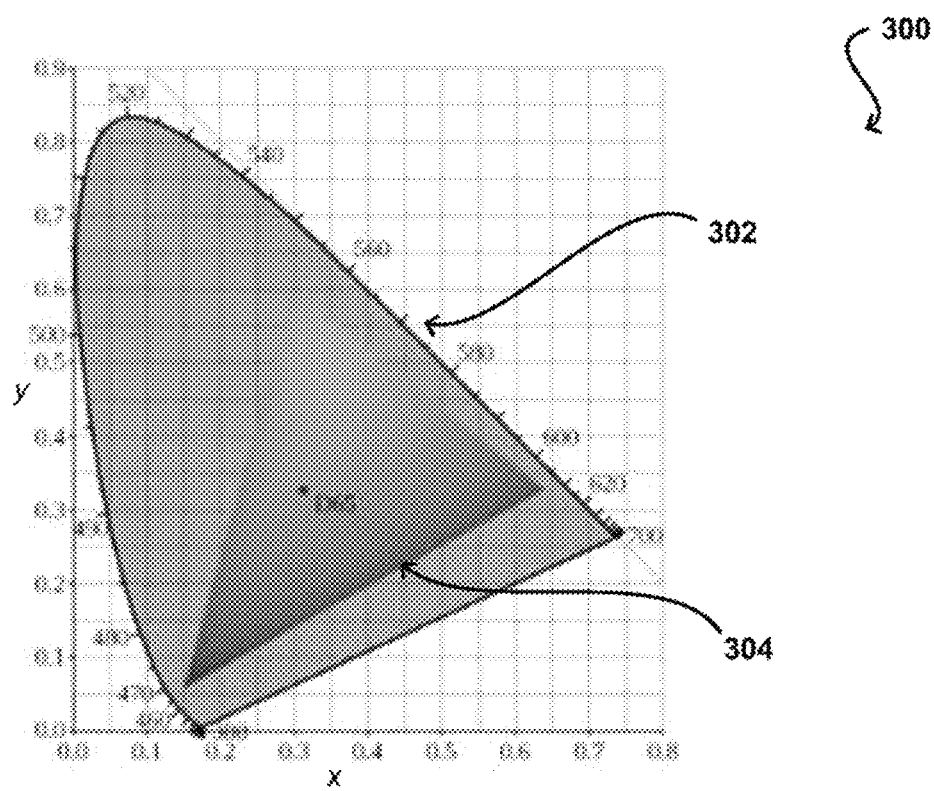
FIGS. 3A and 3B illustrate different color spaces that can be used by different presentation technologies in accordance with various embodiments.
Figure 3B:
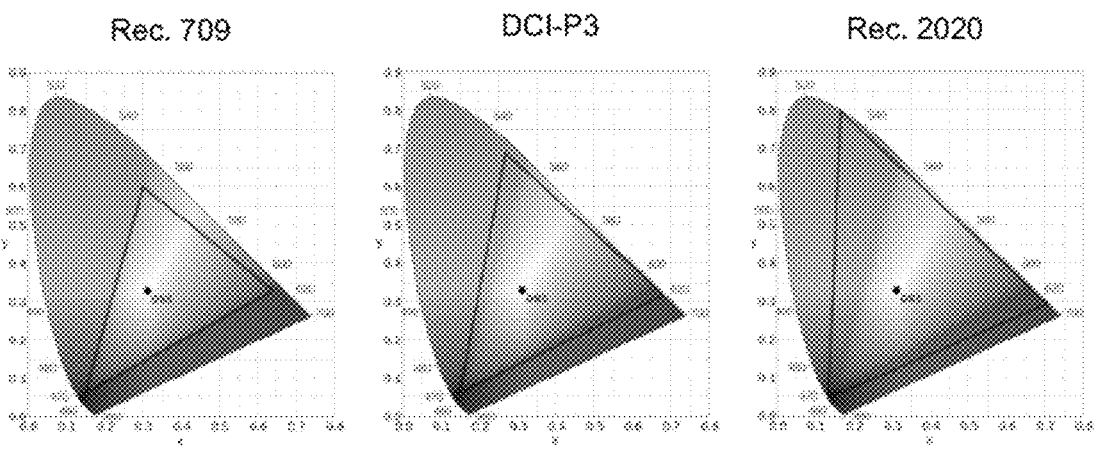

As mentioned, high fidelity color can be provided by being able to provide higher bit depth in at least some embodiments. As illustrated in the plot 300 of FIG. 3A, there can be a large color space 302 used for mastering high quality content, which in this case corresponds to that portion of the spectrum that is visible to the human eye. For a given application, however, only a subset 304 of this color space may be available. While this still provides many colors as illustrated, it can provide fewer variations of any given color, such as many fewer options for green colors. Bit depth generally corresponds to an allocation of bytes and bits per channel, with channels corresponding to pixels with red, green, and blue color values. Assigning 8 bits per channel to a red channel provides 256 possible values for the red channel, but this increases exponentially with higher bit depths. An 8-bit channel providing only 256 possible values for red can provide for limited nuance in that color information. Bumping this up to 10 bit color goes from 256 to 1,024 possible values, and 12 bit color goes to 4,095 possible values. If going up to 16-bit color, which is what major studios are mastering in currently, this goes up to around 65,000 possible color values for the red channel alone. For the combination of the three color channels, cubing this value provides the true number of possible colors that that bit depth can represent, which is around 281 trillion colors. Limiting to an 8 bit connection instead of using a full 16 bit connection can result in a loss of over 99% of the possible color information. As mentioned, such bit reduction can also produce technical problems, such as artifacts and pixilation issues, or even a presence of dead pixels due to over-compression. Factors other than compression ratio impact quality as well as discussed elsewhere herein, however, as may include chroma subsampling and bit depth. As illustrated in the plot 350 of FIG. 3B, different display technologies or standards may each utilize a different region or subset of this color space, as is illustrated for Rec. 709 (useful for content such as HDTV content), DCI-P3 (useful for content such as Digital Cinema content), and Rec. 2020

(useful for content such as 4K TV), with different regions used for different technologies or standards as should be understood. For each of these, it can be detrimental to work with a color space that is smaller than the color space that is to be used for that type of presentation, particularly when allowing for future technologies that can utilize larger regions of this color space. Such an approach can also be used for mastering in a color space such as ACES, which can exceed beyond the visible human spectrum illustrated in FIG. 3A.

Figure 4A:
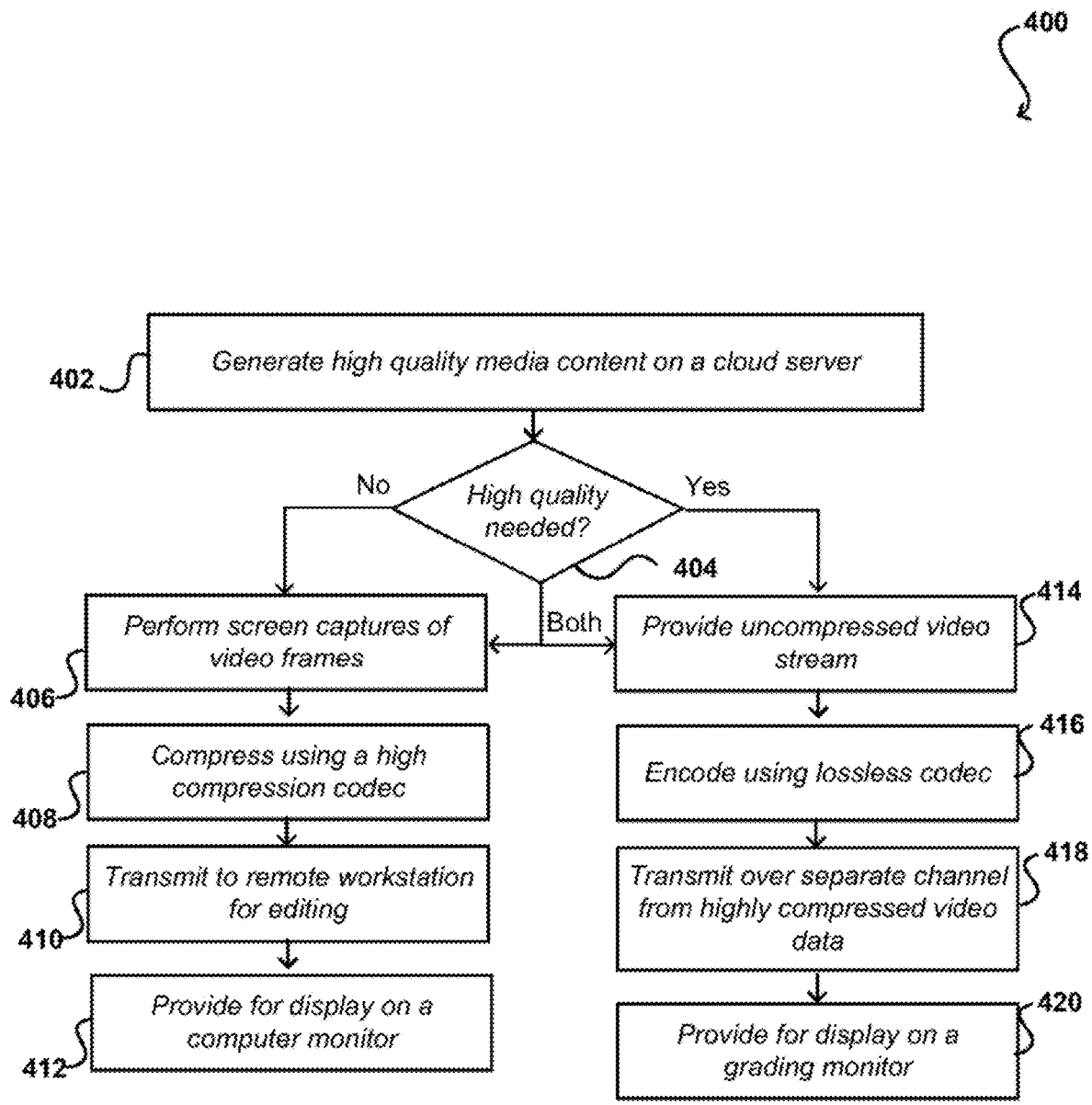
FIGS. 4A and 4B illustrates portions of an example process for providing media content that can be performed in accordance with various embodiments.
Figure 4B:
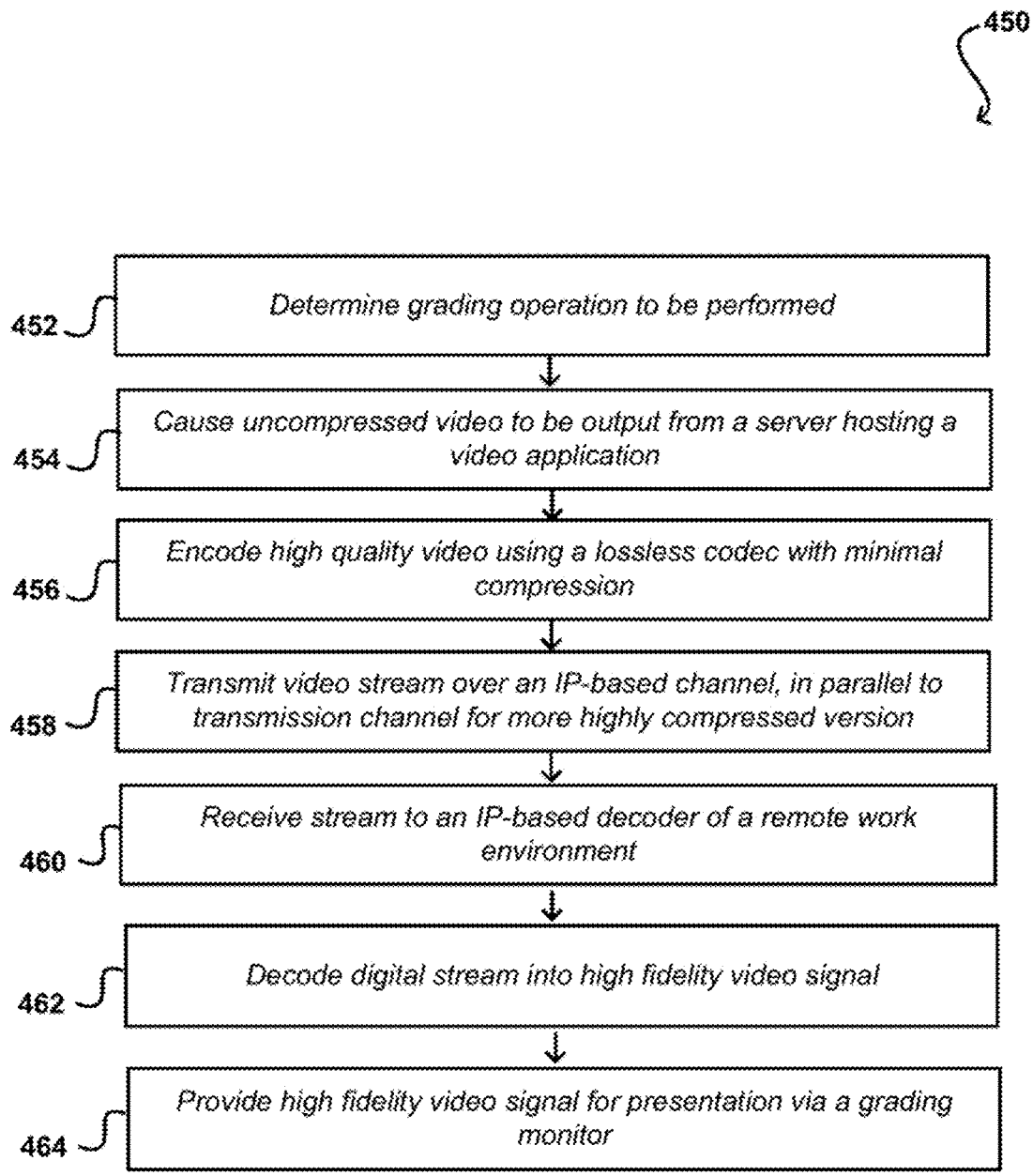

FIGS. 4A and 4B illustrate portions 400, 450 of an example process for providing high fidelity color content from a cloud resource that can be performed in accordance with various embodiments. It should be understood that for this and other processes presented herein that there can be additional, fewer, or alternative steps performed in similar or alternative orders, or at least partially in parallel, within the scope of the various embodiments unless otherwise specifically stated. In the example process 400 of FIG. 4A, high quality media content is generated 402, or otherwise modified or processed, on a cloud server or other such network resource that may be provided by a resource provider as part of a resource provider network or cloud network environment. This high quality media content may include, for example, media mastered, or to be mastered, with a high bit rate and color depth, among other such options discussed and suggested herein. For one or more tasks to be performed with respect to this content, that are to be performed in a remote location such as a home work environment, a determination can be made 404 as to whether high quality content is needed for at least one of those tasks. For many editing tasks, a high quality version is not needed, and a lower quality version may be provided for use on a remote workstation. If a high quality version is not needed at the current time, then screen captures of video frames of this high quality content can be performed 406 or otherwise generated, and these screen captures can be compressed 408 using a high compression codec. Compression can result in a reduction in quality, but that may be sufficient for one or more tasks to be performed, and may be within limits of the workstation and associated components. This compressed version can then be transmitted 410 to this remote workstation for editing or other such task performance, and may be provided 412 for display on at least one computer monitor for presentation as appropriate for the relevant tasks.

If it is determined that a high quality version is needed for a task in this remote environment, then an uncompressed video stream of this full quality content can be provided 414 from an application or server in the cloud environment, and this content can be encoded 416 using a lossless codec to preserve aspects such as color depth. This higher-quality content, which may have some amount of compression performed, can then be transmitted 418 over a separate channel from the highly compressed video transmitted in step 410. This content can then be decoded and provided 420 for display on a grading monitor, or other such device or component capable of presenting such high quality content. If both high and low quality versions are needed, then these versions can be provided in parallel using steps along both paths through this process.

FIG. 4B illustrates a 450 portion of this process with additional detail as to how this higher quality, high fidelity color video can be transmitted to a workstation from a cloud server or other such source. In this example, it can be determined 452 that a grading operation, or other operation requiring high quality content, is to be performed at a remote location, such as in a home work environment. For media to be used for the grading operation, uncompressed video can be caused 454 to be output from a server hosting a video application that produces or modifies that video content, such as by using a CDI interface. This high quality video can be encoded 456 using a lossless codec with minimal compression, such as JPEG XS. This high quality video stream can be transmitted 458 over an IP-based channel, for example, in parallel to a transmission channel used for a more highly compressed version, such as discussed with respect to FIG. 4A. This stream can be received 460 to an IP-based decoder of a remote work environment. This decoder can decode 462 this digital stream into a high fidelity video signal, utilizing at least some automation information from a corresponding video application as appropriate, and provide 464 this high fidelity video signal for presentation via a grading monitor or other high quality presentation device. In some embodiments, at least one separate audio channel may also be utilized to transmit audio that is synchronized to one of these video transmission channels. A high quality video stream may also utilize and additional channel to transmit data useful for tasks such as synchronization, encryption, extended audio, additional color detail, or metadata information, among other such options.

Such a system can also provide for coordination between various components, such as the application, MediaConnect, and an IP-based decoder. Coordination factors such as frame rate and picture size can also be considered and managed. In at least one embodiment, a component such as a Nice DCV server can have the privilege of being able to communicate directly with components such as the workstation and application. Such a server can be enhanced to obtain and recognize the CDI signal, IP address, and other information useful for coordination among these various components. In at least one embodiment, such a server can calibrate an entire workflow for a user so that adding components can be similar to plugging those components into the back of a workstation.

Figure 5:
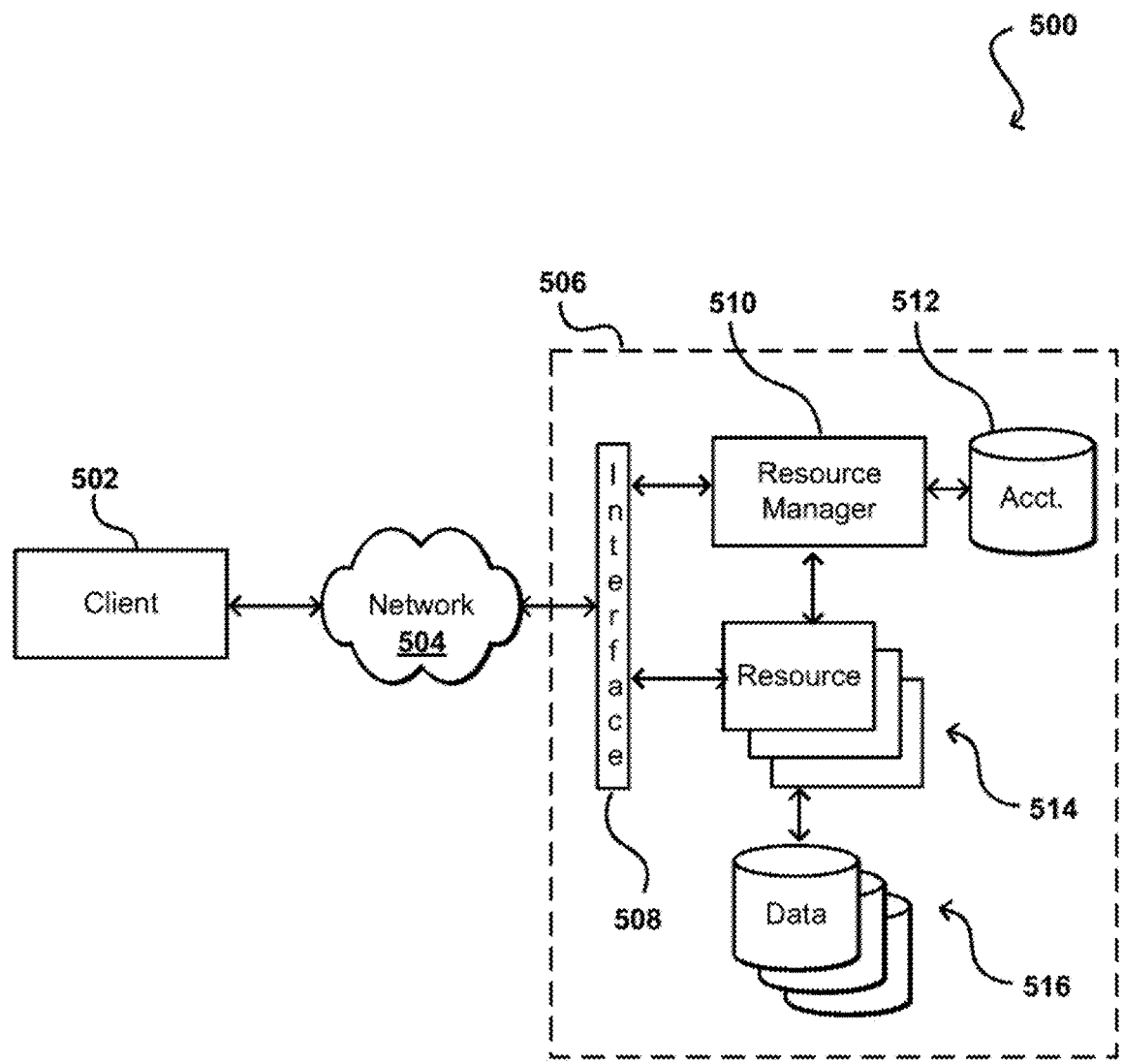
FIG. 5 illustrates components of an example resource environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
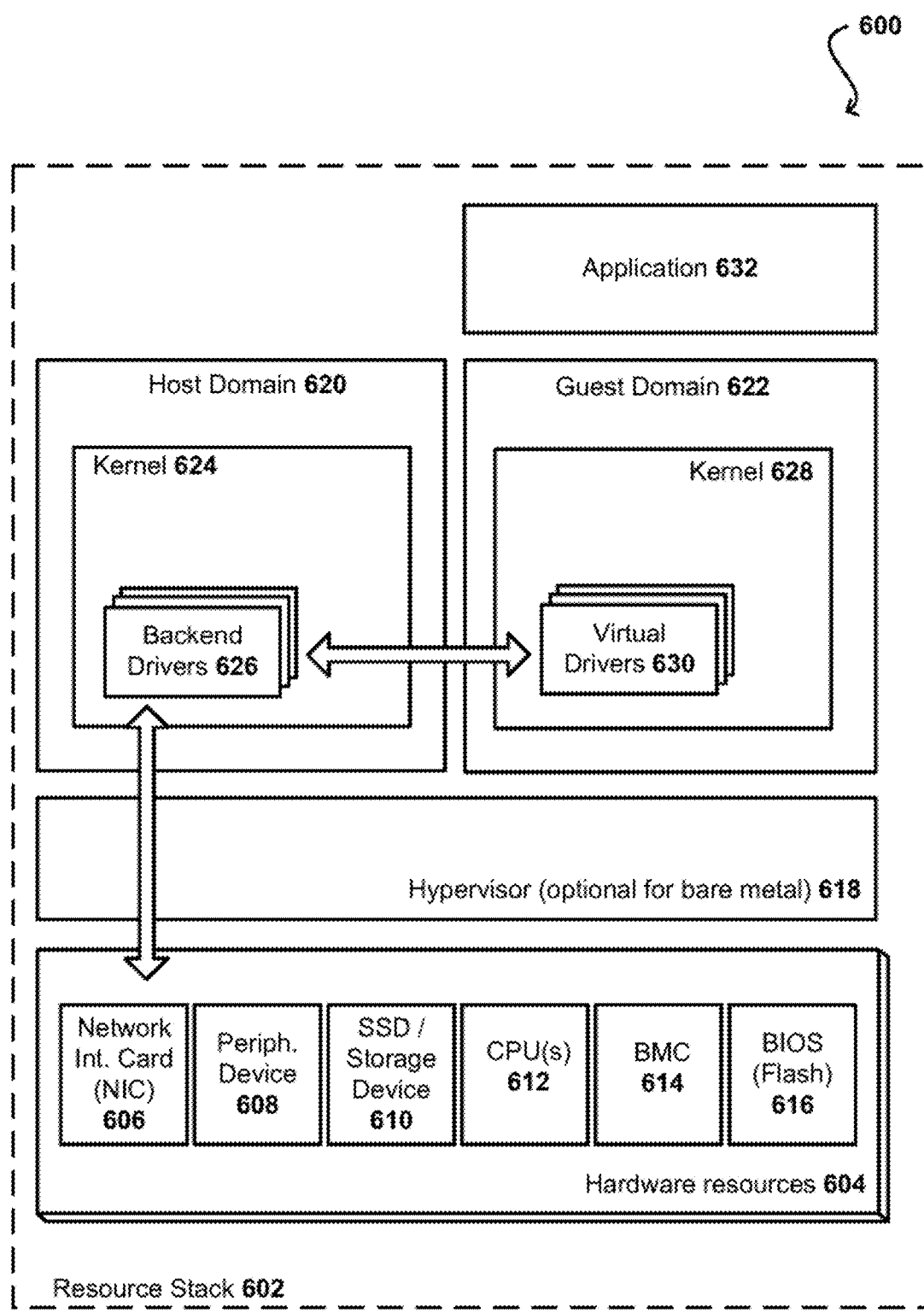
FIG. 6 illustrates components of an example virtualized environment that can be utilized in accordance with various embodiments.

FIG. 6 illustrates an example resource stack 602 of a physical resource 600 that can be utilized in accordance with various embodiments. Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I$^2$C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
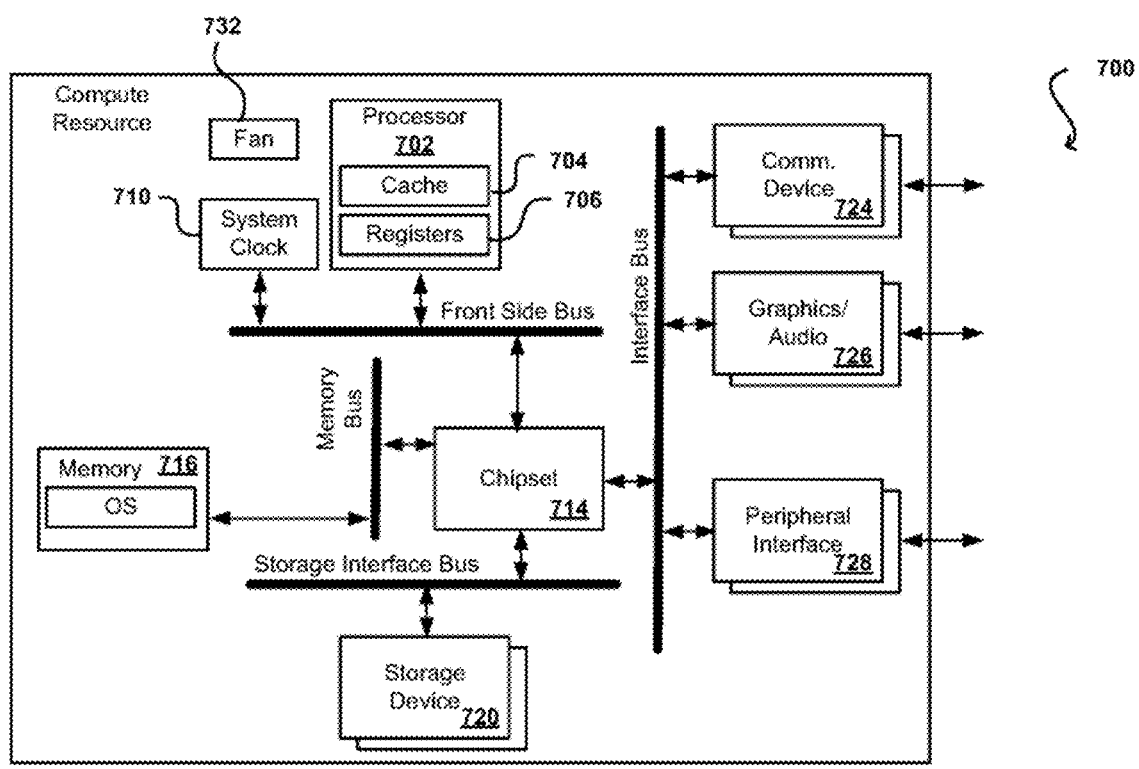
FIG. 7 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 770 for connecting peripheral devices, such as printers, keyboards, and the like. At least one cooling fan 772 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 770, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)) In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   generating, by an application executing on a host device, media content having at least one quality parameter that exceeds a capacity supported by a remote workstation;
   obtaining, from the application, an uncompressed stream of the media content;
   compressing the uncompressed stream using a lossless compression scheme to generate a first data stream; and
   transmitting the first data stream from the host device to a remote decoder associated with the remote workstation, wherein the remote decoder is enabled to utilize the lossless compression scheme to decode the first data stream to produce a video signal corresponding to the media content, and enabled to provide the video signal from the remote decoder to be displayed on a display device, the video signal provided from the remote decoder having the at least one quality parameter that exceeds a capacity supported by the remote workstation.

2. The computer-implemented method of claim 1, wherein the at least one quality parameter includes at least one of a bit depth, a color space, a chroma subsampling setting, or an amount of compression.

3. The computer-implemented method of claim 1, further comprising:
   generating a sequence of screen captures of video frames of the media content;
   compressing the sequence of screen captures using a high compression codec; and
   transmitting the compressed sequence of screen captures as a second data stream to be received by the remote workstation.

4. The computer-implemented method of claim 3, wherein the second data stream includes a compressed version of the content, with the at least one quality parameter having a value that is supported by the remote workstation, and is able to be provided concurrently and in parallel with the first data stream.

5. The computer-implemented method of claim 4, wherein the second data stream is to be used with an application executing on the remote workstation for performing an editing task for the media content, the media content from the second stream capable of being displayed on a computer monitor in communication with the remote workstation.

6. The computer-implemented method of claim 4, wherein the media content in the first data stream is to be used for color grading tasks, visual effects (VFX) compositing, digital intermediate finishing, or master quality control for the media content.

7. The computer-implemented method of claim 1, wherein the at least one quality parameter corresponds to at least one of: a bit depth of at least 10, at least 4:2:0 chroma subsampling setting, or an uncompressed state.

8. The computer-implemented method of claim 1, wherein the host device is a server provided by a cloud provider in a cloud environment, and wherein the remote workstation and the remote decoder are provided in a separate remote work environment.

9. The computer-implemented method of claim 1, wherein the uncompressed stream is transcoded into the second stream and transmitted in real time.

10. The computer-implemented method of claim 1, wherein the second stream is compressed using a lossless codec and transmitted according to a SMPTE digital transmission standard.

11. A system, comprising:
    at least one processor; and
    memory including instructions that, when executed by the at least one processor, cause the system to:
    generate, by an application executing on the system, media content having at least one quality parameter that exceeds a capacity supported by a remote workstation;
    obtain, from the application, an uncompressed stream of the media content;
    compress the uncompressed stream using a lossless compression scheme to generate a first data stream; and
    transmit the first data stream from the system to a remote decoder associated with the remote workstation, wherein the remote decoder is enabled to utilize the lossless compression scheme to decode the first data stream to produce a video signal corresponding to the media content, and enabled to provide the video signal from the remote decoder to be displayed on a display device, the video signal provided from the remote decoder having the at least one quality parameter that exceeds a capacity supported by the remote workstation.

12. The system of claim 11, wherein the at least one quality parameter includes at least one of a bit depth, color space, chroma subsampling setting, or amount of compression.

13. The system of claim 11, wherein the instructions when executed further cause the system to:
    generate a sequence of screen captures of video frames of the media content;
    compress the sequence of screen captures using a high compression codec; and
    transmit the compressed sequence of screen captures as a second data stream to be received by the remote workstation.

14. The system of claim 13, wherein the second data stream includes a compressed version of the content that includes the at least one quality parameter having a value that is supported by the remote workstation, and wherein the second data stream is to be used with an application executing on the remote workstation for performing an editing task for the media content, the media content from the second stream capable of being displayed on a computer monitor in communication with the remote workstation.

15. The system of claim 11, wherein the system is provided by a cloud provider in a cloud environment, and wherein the remote workstation and the remote decoder are provided in a separate remote work environment.

16. A non-transitory computer-readable storage medium storing instructions that, when executed by a processor of a computing device, cause the computing device to:
    generate, by an application executing on a host device, media content having at least one quality parameter that exceeds a capacity supported by a remote workstation;
    obtain, from the application, an uncompressed stream of the media content;

compress the uncompressed stream using a lossless compression scheme to generate a first data stream; and transmit the first data stream from the host device to a remote decoder associated with the remote workstation, wherein the remote decoder is enabled to utilize the lossless compression scheme to decode the first data stream to produce a video signal corresponding to the media content, and enabled to provide the video signal from the remote decoder to be displayed on a display device, the video signal provided from the remote decoder having the at least one quality parameter that exceeds a capacity supported by the remote workstation.

17. The non-transitory computer-readable storage medium of claim 16, wherein the at least one quality parameter includes at least one of a bit depth, color space, chroma subsampling setting, or amount of compression.

18. The non-transitory computer-readable storage medium of claim 16, wherein the instructions when executed further cause the computing device to:

generate a sequence of screen captures of video frames of the media content;

compress the sequence of screen captures using a high compression codec; and transmit the compressed sequence of screen captures as a second data stream to be received by the remote workstation.

19. The non-transitory computer-readable storage medium of claim 16, wherein the second data stream includes a compressed version of the content that includes the at least one quality parameter having a value that is supported by the remote workstation, and wherein the second data stream is to be used with an application executing on the remote workstation for performing an editing task for the media content, the media content from the second stream capable of being displayed on a computer monitor in communication with the remote workstation.

20. The non-transitory computer-readable storage medium of claim 16, wherein the system is provided by a cloud provider in a cloud environment, and wherein the remote workstation and the remote decoder are provided in a separate remote work environment.

* * * * *